United States Patent
Tan et al.

(10) Patent No.: US 11,085,993 B2
(45) Date of Patent: Aug. 10, 2021

(54) METHOD AND APPARATUS OF POSITIONING WITH CURVED LIGHT SURFACE

(71) Applicant: Lingtrack Technology (Shenzhen) Co. Ltd., Shenzhen (CN)

(72) Inventors: Guang Tan, Shenzhen (CN); Zhaoguang Wang, Shenzhen (CN); Yong Liu, Shenzhen (CN)

(73) Assignee: Lingtrack Technology (Shenzhen) Co., Ltd., Shenzhen (CN)

(*) Notice: Subject to any disclaimer, the term of this patent is extended or adjusted under 35 U.S.C. 154(b) by 0 days.

(21) Appl. No.: 16/078,550

(22) PCT Filed: Dec. 26, 2017

(86) PCT No.: PCT/CN2017/118499
§ 371 (c)(1),
(2) Date: Aug. 21, 2018

(87) PCT Pub. No.: WO2019/100513
PCT Pub. Date: May 31, 2019

(65) Prior Publication Data
US 2021/0190898 A1    Jun. 24, 2021

(30) Foreign Application Priority Data
Nov. 27, 2017   (CN) .......................... 201711205726.9

(51) Int. Cl.
*G01S 5/16*     (2006.01)
*H04B 10/40*    (2013.01)
(Continued)

(52) U.S. Cl.
CPC ............ *G01S 5/16* (2013.01); *H04B 10/1149* (2013.01); *G01C 21/206* (2013.01); *G01S 1/70* (2013.01); *H04B 10/40* (2013.01)

(58) Field of Classification Search
CPC ....... H04B 10/40; H04B 10/1149; G01S 1/70; G01S 5/16; G01C 21/206; G06T 7/70
(Continued)

(56) References Cited

U.S. PATENT DOCUMENTS

| | | | | |
|---|---|---|---|---|
| 2002/0060788 A1* | 5/2002 | Ohtomo | ............... | G01C 15/002 356/139.1 |
| 2005/0033474 A1* | 2/2005 | Kim | ..................... | G05D 1/0234 700/245 |

(Continued)

FOREIGN PATENT DOCUMENTS

CN      2457600 Y     10/2001
CN      101939772 A    1/2011
(Continued)

OTHER PUBLICATIONS

Chinese Office Action related to Chinese Application No. 201711205726.9 dated Nov. 22, 2019.
(Continued)

*Primary Examiner* — Dalzid E Singh
(74) *Attorney, Agent, or Firm* — von Briesen & Roper, s.c.

(57) ABSTRACT

An apparatus of positioning with curved light surface includes a transmitter for transmitting optical signals and a receiver for receiving optical signals. The apparatus determines a position of the receiver based on the received optical signals. The transmitter includes a light emitter for emitting optical signals of at least two flashing frequencies and a hollow hemispherical cover including two fixed-angle opaque regions, a variable-angle opaque region, and transparent regions located therebetween. The present invention further relates to a method of positioning with curved light surface.

10 Claims, 4 Drawing Sheets

(51) Int. Cl.
  *H04B 10/114* (2013.01)
  *G01S 1/70* (2006.01)
  *G01C 21/20* (2006.01)

(58) Field of Classification Search
  USPC .......................................................... 356/614
  See application file for complete search history.

(56) References Cited

U.S. PATENT DOCUMENTS

| | | | |
|---|---|---|---|
| 2017/0336596 A1* | 11/2017 | Nishimoto | G02B 7/1824 |
| 2017/0346571 A1* | 11/2017 | Kakimoto | G08C 23/04 |
| 2018/0167140 A1* | 6/2018 | Brandt-Pearce | H04B 10/1149 |
| 2019/0012801 A1* | 1/2019 | Mason | G01S 5/16 |
| 2019/0041490 A1* | 2/2019 | Dong | G01S 1/70 |
| 2019/0044616 A1* | 2/2019 | Laski | G08G 1/163 |

FOREIGN PATENT DOCUMENTS

| | | |
|---|---|---|
| CN | 105548904 A | 5/2015 |
| CN | 104914407 A | 9/2015 |
| CN | 105157696 A | 12/2015 |
| CN | 304168959 S | 6/2017 |
| CN | 304241325 S | 8/2017 |
| WO | WO 2016/200792 | 12/2016 |

OTHER PUBLICATIONS

International Search Report for Application No. PCT/CN2017/118499 dated Aug. 30, 2018.

* cited by examiner

METHOD AND APPARATUS OF POSITIONING WITH CURVED LIGHT SURFACE

CROSS-REFERENCE TO RELATED APPLICATION

This patent application is a 35 USC § 371 U.S. national stage of International Application No. PCT/CN2017/118499 filed on Dec. 26, 2017, which claims priority under the Paris Convention to the Chinese Patent Application No. CN 201711205726.9 filed on Nov. 27, 2017.

TECHNICAL FIELD

The present disclosure relates to spatial positioning technology, and more particularly relates to a method and an apparatus of positioning with curved light surface.

BACKGROUND

In emerging applications such as robotics and large space virtual reality, position tracking is an important supporting technique. In an intelligent production environment, when a robot assists to assemble and convey materials and products, it requires precise location instructions to ensure correct delivery. Entertainment robots organized intro groups need to collaborate with each other based on precise locations in order to accomplish certain tasks. Currently, main optical positioning technologies have either a low accuracy, or a small coverage area, or a high cost, and can only achieve accuracy to meters or decimeters. Due to building blockage, satellite signals cannot provide indoor positioning service and the achievable accuracy does not meet requirements.

SUMMARY

Accordingly, it is necessary to provide a method and an apparatus for positioning based on curved light surface, in order to solve the problems of low accuracy, small coverage, and high cost faced by traditional optical positioning technologies.

An apparatus of positioning with curved light surface, includes a transmitter and a receiver. The transmitter is capable of transmitting optical signals to the receiver. The receiver is capable of receiving the optical signals transmitted by the transmitter. The apparatus of positioning with curved light surface determines a position of the receiver according to the optical signals received by the receiver, The transmitter includes a light emitter, which is capable of emitting signals of at least two flashing frequencies; and a hemispherical cover, which is provided with a fixed-angle opaque region and a variable-angle opaque region. A region between the fixed-angle opaque region and a variable-angle opaque region defines a light passing region. Each radius angle of each arc generated by an intersection of each line of latitude of the cover and the fixed-angle opaque region is the same, and each radius angle of each arc generated by an intersection of each line of latitude of the cover and the variable-angle opaque region monotonically increases or decreases as the latitude increases.

In one embodiment, the fixed-angle opaque region includes a first fixed-angle opaque region and a second fixed-angle opaque region, and perpendicular projections of these two regions on a bottom circle of the cover are sectors.

In one embodiment, a perpendicular projection of the variable-angle opaque region on a bottom circle of the cover is surrounded by three arcs, one arc is centered on a center of the bottom circle of the cover, the other two arcs intersect at the center of the bottom circle and respectively intersect with two ends of the first arc.

In one embodiment, radius angles of the other two arcs are the same, and the other two arcs protrude toward the first arc.

In one embodiment, the transmitter is at least provided with a controller, a driving device, a stationary base, and a rotary base; the controller is coupled to the driving device and is configured to control an operation of the driving device; the driving device is connected to the rotary base and is configured to drive the rotary base to rotate at a preset angular velocity; and the rotated base is fixed connected to the cover and is capable of driving the cover to rotate synchronously when rotating.

In one embodiment, the transmitter is further provided with a rotation detector configured to detect a rotation period of the rotary base; and the controller controls the light emitter to emit optical signals with alternating flashing frequencies in successive rotation periods based on the detection result of the rotation detector.

In one embodiment, the rotation detector includes an light coupler and a light blocking plate, the light coupler is provided with a notch; and the light blocking plate is positioned on the rotary base and a position thereof corresponds to the light coupler, when the rotary base rotates, the light blocking plate is capable of passing through the notch of the light coupler.

In one embodiment, the receiver is at least provided with a receiving single chip microcomputer (SCM), an optical sensor, and a wireless module; the optical sensor receives the optical signals transmitted by the transmitter; the receiving single chip microcomputer is coupled to the optical sensor and is configured to process information of the optical signals received by the optical sensor; and the wireless module is coupled to the receiving single chip microcomputer and is configured to receive a processed result of the receiving chip microcomputer and transmit the processed result to a server.

A method of positioning with curved light surface, wherein the transmitter transmits optical signals with a preset flashing frequency via the light emitter, the optical signals pass through the opaque region of the cover to generate a shadow; the transmitter activates a driving device to rotate the cover at a preset angular velocity; the receiver receives the optical signals at a preset sampling frequency and obtains a shadow width and a frame length of the variable-angle opaque region by means of analog-to-digital conversion of an optical sensor; and a receiving single chip microcomputer in the receiver calculates a position of the receiver according to preset information.

In one embodiment, the preset information at least includes a radius of the cover, diameters of circles that contain the symmetric arcs of the variable-angle opaque region, a rotational speed of the rotary base, a radius angle of the arc generated by the intersection of the fixed-angle opaque region and an arbitrary latitude line of the cover, height of the transmitter, and a vertical height difference between the transmitter and the receiver.

The apparatus and method of positioning with curved light surface provided herein the present invention can accurately position a receiver, and the receiver can be placed on an object surface to receive optical signals of a transmitter, so that a precise indoor positioning can be carried out. Therefore, in an intelligent production environment, a robot can accurately assist to assemble and convey materials and products. A positioning accuracy of the present invention can reach centimeters to millimeters level.

DETAILED DESCRIPTION OF THE EMBODIMENTS

In order to facilitate understanding of the present disclosure, a more comprehensive description of an apparatus and a method of positioning with curved light surface will be provided below with reference to the accompanying drawings. A preferred embodiment of the apparatus and the method of positioning with curved light surface is given in the drawings. However, the apparatus and the method of positioning with curved light surface can be implemented in many different forms and is not limited to the embodiments described in this disclosure. Rather, these embodiments are provided so that this disclosure of the apparatus and the method of positioning with curved light surface will be thorough and complete.

Unless the context clearly requires otherwise, all technical and scientific terms used herein have the same meaning as commonly understood by one of ordinary skill in the art to which this invention belongs. The terms used in the description of the apparatus and the method of positioning with curved light surface in the present disclosure is merely for the purpose of describing specific embodiments and is not intended to limit the present disclosure.

Figure 1:
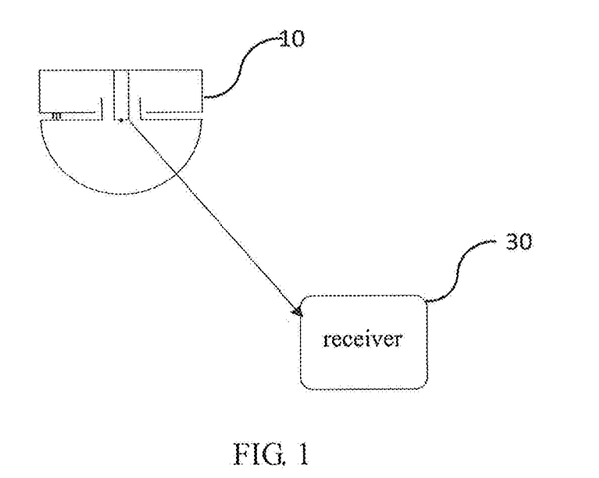
FIG. 1 is a schematic diagram of an apparatus of positioning with curved light surface in accordance with an embodiment.

FIG. 1 illustrates a schematic diagram of an apparatus of positioning with curved light surface in accordance with an embodiment. The apparatus of positioning with curved light surface includes a transmitter 10 and a receiver 30. The transmitter 10 is used for transmitting signals. The receiver 30 is used for receiving signals transmitted by the transmitter 10 and is capable of determining a position of itself according to the received signals.

Figure 2:
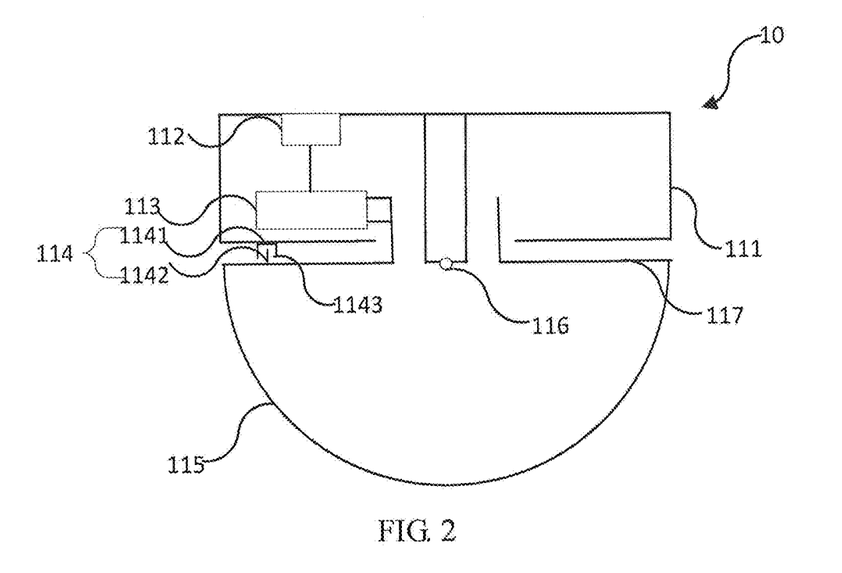
FIG. 2 is a schematic diagram of a transmitter of the apparatus of FIG. 1.

Referring to FIG. 2, in the illustrated embodiment, the transmitter 10 includes a stationary base 111, a controller 112, a driving device 113, a rotation detector 114, a cover 115, a light emitter 116, and a rotary base 117.

The light emitter 116 is used for emitting optical signals with preset flashing frequencies. Specifically, the light emitter 116 can be a light emitting diode (LED), a compact fluorescent lamp (CFL), or other light emitter which emits optical signals that can be received by an optical sensor. In one embodiment, the light emitter 116 is an LED, which is located at the center of a bottom circle of the cover 115. The light emitter 116 is capable of emitting optical signals of at least two flashing frequencies.

Furthermore, the light emitter 116 is installed on the stationary base 111. Specifically, the stationary base 111 has a cylindrical mounting portion. A surface of the mounting portion facing the cover 116 is coplanar with the bottom circle of the cover 115. The light emitter 116 is located on the surface of the mounting portion facing the cover 115 and coincides with the center of the bottom circle of the cover 115.

The driving device 113 is coupled to the controller 112 and located inside the stationary base 111. The driving device 113 is connected to the rotary base 117 and is capable of driving the rotary base 117 to rotate at a constant and preset angular velocity.

The controller 112 controls the driving device 113 to operate in a preset manner.

The rotation detector 114 is used to detect the beginning of a rotation cycle of the rotary base 117. In this embodiment, the rotation detector 114 generates a detection signal when the rotary base 117 rotates by one complete rotation cycle, and transmits the detection signal to the controller 112. The controller 112 controls the light emitter 116 to switch between optical signals of a first flashing frequency and a second flashing frequency. Specifically, the controller 112 controls the optical signals in successive rotation periods to be with alternating flashing frequencies.

Specifically, the rotation detector 114 includes an light coupler 1141 and a light blocking plate 1142. The light coupler 1141 is positioned on the stationary base 111. The light blocking plate 1142 is fixed on the rotary base 117 and is capable of rotating with the rotary base 117. The light coupler 1141 has a notch 1143 facing the rotary base 117. The light blocking plate 1142 is arranged corresponding to the notch 1143. In other words, during a rotation of the light blocking plate 1142 driven by the rotary base, the light blocking plate 1142 is capable of passing through the notch 1143 without contacting the light coupler 1141. An optical signal of the light coupler 1141 can pass through two sides of the notch 1143. When the light blocking plate 1142 passes the notch 1143 of the light coupler 1141, the optical signal of the light coupler 1141 is blocked and the light coupler 1141 can detect the blocking event. At this time, the controller 112 controls the light emitter 116 to switch from the first flashing frequency to the second flashing frequency, or vice versa.

The rotary base 117 is fixed with the cover 115, so that the cover 115 can be rotated synchronously with the rotary base 117. The rotary base 117 can be optionally shaped as a circular disc, a circular ring, or other annular structures. In one embodiment, the rotary base 117 is shaped as a circular ring.

Figure 3:
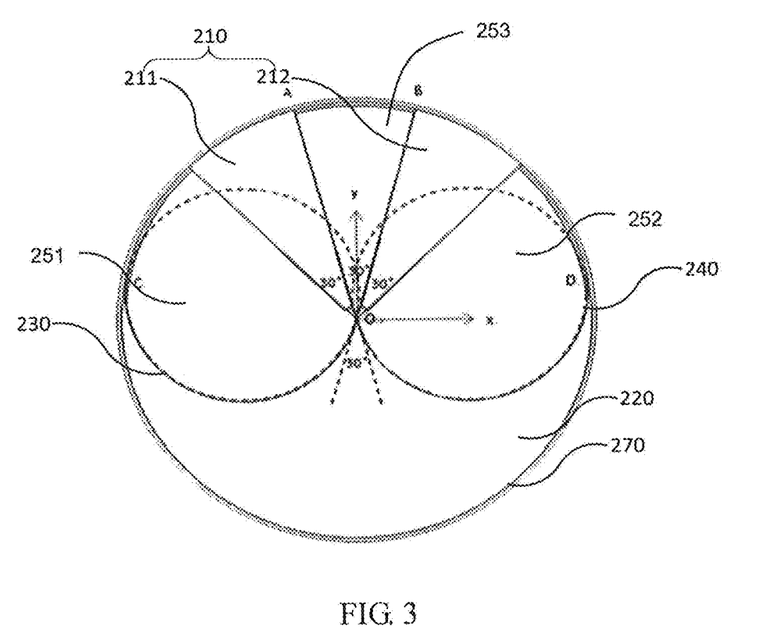
FIG. 3 is a bottom view of a cover of the transmitter of FIG. 2.

Further referring to FIG. 3, the cover 115 is of a hemispherical shape. A hemispherical space is defined inside the cover 115. The cover 115 can be a hollow semi-ellipsoidal cover, a hollow semi-spherical cover, or other hollow hemispherical structures. In the illustrated embodiment, the cover 115 is a semispherical cover.

A spherical surface of the cover 115 is provided with a fixed-angle opaque region 210 and a variable-angle opaque region 220. The fixed-angle opaque region 210 and the variable-angle opaque region 220 are opaque portions of the spherical surface of the cover 115. Other regions of the spherical surface of the cover 115 are transparent portions, where the optical signals of the light emitter 116 can pass through.

A perpendicular projection of the variable-angle opaque region 220 on the bottom circle of the cover 115 is surrounded by three arcs. One arc is centered on the center of the bottom circle of the cover 115, and the other two arcs intersect at the center of the bottom circle and respectively intersect with two ends of the first arc. Radius angles of the other two arcs are the same, and the other two arcs protrude toward the first arc.

The cover 115 includes a first fixed-angle opaque portion 211 and a second fixed-angle opaque portion 212. The following takes the first fixed-angle opaque portion 211 as an example to describe the specific shape thereof. A perpendicular projection of the first fixed-angle opaque portion 211 on the bottom circle of the cover 115 is a sector, whose arc center coincides with the center of the bottom circle of the cover 115. A radius angle corresponding to the arc of the sector is 30 degrees. It should be understood that the radius angle corresponding to the arc of the sector 30 could be other degrees, such as 15 degrees, 45 degrees, and the like. In the so called fixed-angle opaque portion, radius angles of arcs generated by intersections of lines of latitude of the cover 112 and the first fixed-angle opaque portion 211 are the same. The second fixed-angle opaque portion 212 has a same shape of the first fixed-angle opaque portion 211, no more tautology here. When the cover 115 is rotated at a constant angular velocity, the shadow cast on the receiver 30 by the first fixed-angle opaque portion 211 or the second fixed-angle opaque portion 212 can be determined accordingly. Therefore the angular velocity of the cover 115 can be tuned according to the duration of the shadow of the first fixed-angle opaque portion 211 or the second fixed-angle opaque portion 212 sweeping over the receiver 30, in order to improve the positioning accuracy of the apparatus.

In the illustrated embodiment, an interval angle between the sectors generated by the perpendicular projections of the first fixed-angle opaque portion 211 and the second fixed-angle opaque portion 212 on the bottom circle is 30 degrees. It should be understood that the interval angle between the sectors generated by the perpendicular projections of the first fixed-angle opaque portion 211 and the second fixed-angle opaque portion 212 on the bottom circle can be other degrees, such as 15 degrees, 40 degrees, 45 degrees, 60 degrees, and the like.

A perpendicular projection of the variable-angle opaque region 220 on the bottom circle of the cover 115 is surrounded by three arcs, which includes a first arc 270, a second arc 230, and a third arc 240. An arc center of the first arc 270 is centered on the center of the bottom circle. The second arc 230 and the third arc 240 intersect at the center of the bottom circle and An end of each of the second arc 230 and the third arc 240 intersects at the center of the bottom circle and respectively intersect with two ends of the first arc 270. In the illustrated embodiment, the second arc 230 and the third arc 240 are partial arcs and radius angles of the second arc 230 and the third arc 240 are the same. The second and third arcs 230 and 240 protrude toward the first arc 270. Radius angles of arcs generated by intersections of lines of latitude of the cover 115 and the variable-angle opaque region 220 are different, that's why it is called variable-angle opaque region 220. Specifically, each radius angle of each arc generated by an intersection of each line of latitude of the cover 115 and the variable-angle opaque region 220 monotonically decreases as the latitude increases.

It should be understood that a shape of the variable-angle opaque region 220 is not limited to the illustrated embodiment. In one embodiment, the second arc 230 and the third arc 240 are not symmetrical. In another embodiment, each radius angle of each arc generated by an intersection of each line of latitude of the cover 115 and the variable-angle opaque region 220 monotonically increases as the latitude increases, at this time, the second arc 230 and the third arc 240 protrude away from the first arc 270.

In addition, it should be understood that the second arc 230 and the third arc 240 may be replaced with other arbitrary suitable shapes, as long as that each radius angle of each arc generated by an intersection of each line of latitude of the cover 115 and the variable-angle opaque region 220 monotonically increases or decreases as the latitude increases.

The latitude of the cover 115 described in above embodiments is line segments of circles on the spherical surface of the cover 115. The latitude of the cover 115 decreases gradually from the polar of the cover 115 to the bottom circle of the cover 115, wherein the polar of the cover corresponds to a point on the surface of the cover 115 which has a maximum vertical distance from a top of the cover 115 to the bottom circle of the cover 115.

Figure 4:
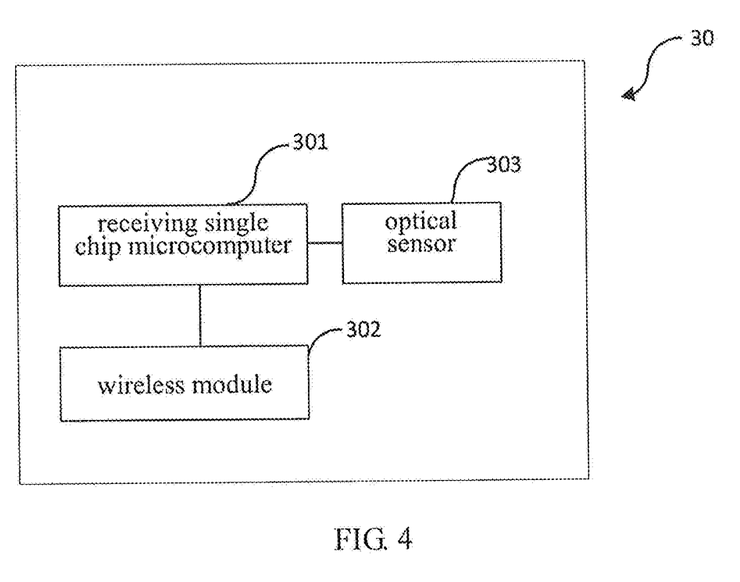
FIG. 4 is a block diagram of a receiver of FIG. 1.

FIG. 4 illustrates a block diagram of the receiver in accordance with an embodiment. In the illustrated embodiment, the receiver 30 includes a receiving single chip microcomputer (SCM) 301, a wireless module 302, and an optical sensor 303. The optical sensor 303 is capable of receiving the optical signals transmitted from the light emitter 116 of the transmitter 10. The optical signals are analog-to-digital converted and transmitted to the receiving SCM 301. The receiving SCM 301 calculates a vertical angle and a horizontal angle of the optical sensor 303 with respect to the light emitter 116 using the optical signals data and preset information, and transmits a calculation result to the wireless module 302. The wireless module 302 is capable of wirelessly transmitting data to a server. Specific but not limited, the wireless module 302 can transmit the calculation result of the receiving SCM 301 to the server.

Specifically, the wireless module 302 can be Bluetooth, GPRS, EDGE, 2G, 3G, 4G, 5G communication devices or other wireless transmission devices.

A method of positioning with curved light surface is specifically described in accordance with above embodiments and FIG. 5, FIG. 6, FIG. 7, and FIG. 8.

In this embodiment, the preset information of the receiver 30 includes a radius 411 of the bottom circle of the cover 115, a diameter 412 of a circle that contains a shorter arc of the variable-angle opaque region 220, rotational speed of the rotary base, and a radius angle of the arc generated by the intersection of the fixed-angle opaque region and an arbitrary latitude line of the cover, height of the transmitter, a vertical height difference 422 between the transmitter and the receiver.

Since the radius angle of the fixed-angle opaque region 210 along the lines of latitude is constant and known in advance, a reference width can be calculated by collecting optical signals from the optical sensor 303, based on a sampling frequency Rate and a rotation speed Rev of the rotary base 117. The reference width is a shadow width corresponding to the fixed-angle opaque region 210.

The receiver 30 utilizes the optical signals collected during a rotation period of the rotary base 117 of the transmitter 10 to simulate an annular buffer, and obtain relative positions of a shadow width 416 of the first fixed-angle opaque region, a shadow width 417 of the second fixed-angle opaque region, and a shadow width 414 of the variable-angle opaque region. The horizontal angle θ can be obtained according to relative positions of the shadow width 416 of the first fixed-angle opaque region 211 and the shadow width 417 of the second fixed-angle opaque region 212.

Figure 5:
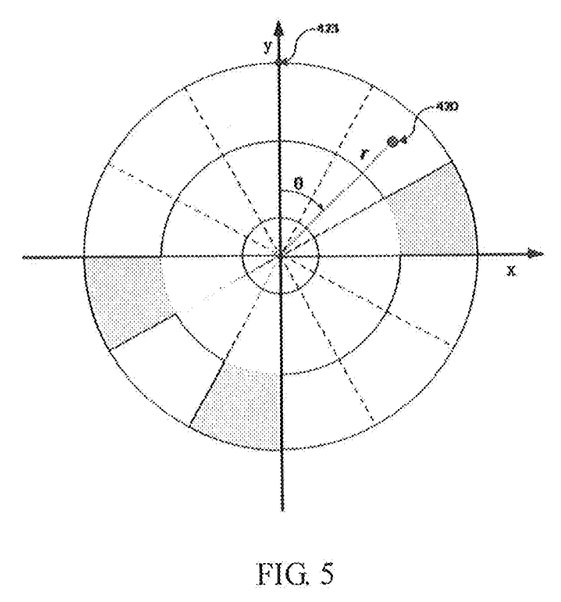
FIG. 5 is a polar coordinate system diagram of a projection of the transmitter of FIG. 1 on the ground.

Referring to FIG. 5, FIG. 5 is a polar coordinate system diagram of a projection of the transmitter of FIG. 1 on the ground.

The horizontal angle θ is an angle between a line 423 from a center of polar coordinates following the direction of the starting point of the rotation and a line 420 from the center of polar coordinates to the receiver 30.

Figure 6:
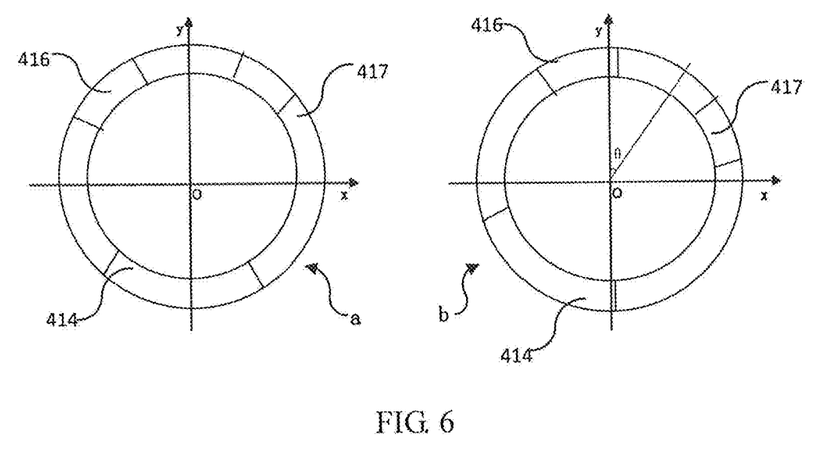
FIG. 6 is a diagram of a circular buffer of FIG. 1.

Referring to FIG. 6, the annular buffer a rotates from an O point to the annular buffer b. When a centerline of the shadow width 416 of the first fixed-angle opaque region 211 and the shadow width 417 of the second fixed-angle opaque region 212 coincides with the line 423 from the center of the polar coordinates to the starting point of the rotation, the angle θ=0°. When the rotary base 117 rotates, the horizontal angle θ is an angle between the centerline of the shadow width 416 of the first fixed-angle opaque region 211 and the shadow width 417 of the second fixed-angle opaque region 212 and the line from the center of the polar coordinates to the starting point of the rotation.

Figure 7:
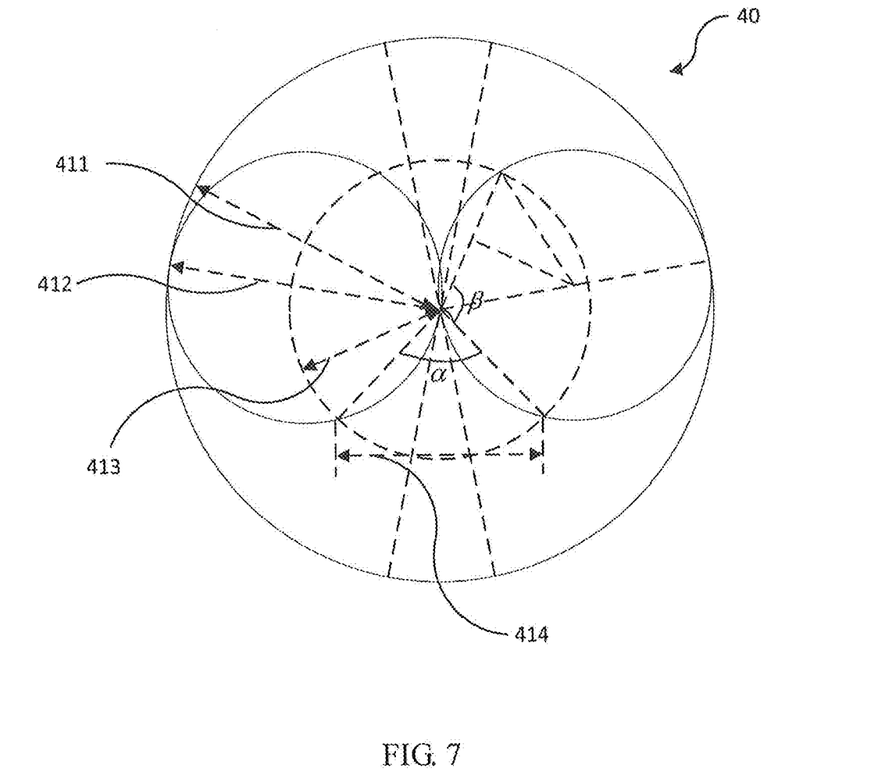
FIG. 7 is a first schematic diagram of positioning algorithm with curved light surface.

In FIG. 7, the shadow width 414 of the variable-angle opaque region 220 can be obtained by counting the number of samples received by the receiver during a time interval in which the shadow sweeps over the receiver.

In a calculation example of FIG. 7, two shorter arcs of the variable-angle opaque region 220 are generated by two circles whose diameters are equal to the radius of the bottom circle of the cover and both pass the center of the bottom circle and are tangent to the bottom circle.

In the curved light surface positioning algorithm hereafter:

Rshade is the radius 411 of the bottom circle of the cover 115;

Rcut is a diameter 412 of a circle that contains the shorter arc of the variable-angle opaque region 220;

Rsense is a radius 413 of a circle corresponding to a line of latitude that passes point Q;

ShadowLen is the shadow width 414 of the variable-angle opaque region 220, which can be acquired by counting the number of samples received by the receiver 30 during the time interval in which the shadow sweeps overs the receiver 30;

PeriodLen is the frame length, that is, the number of samples received by the receiver during a rotation period of the cover, which is obtained from a formula:

$$PeriodLen = Rate*60/Rev;$$

r is a horizontal distance 421 between the light emitter and the receiver;

H is the vertical height difference 422 between the transmitter and the receiver.

Figure 8:
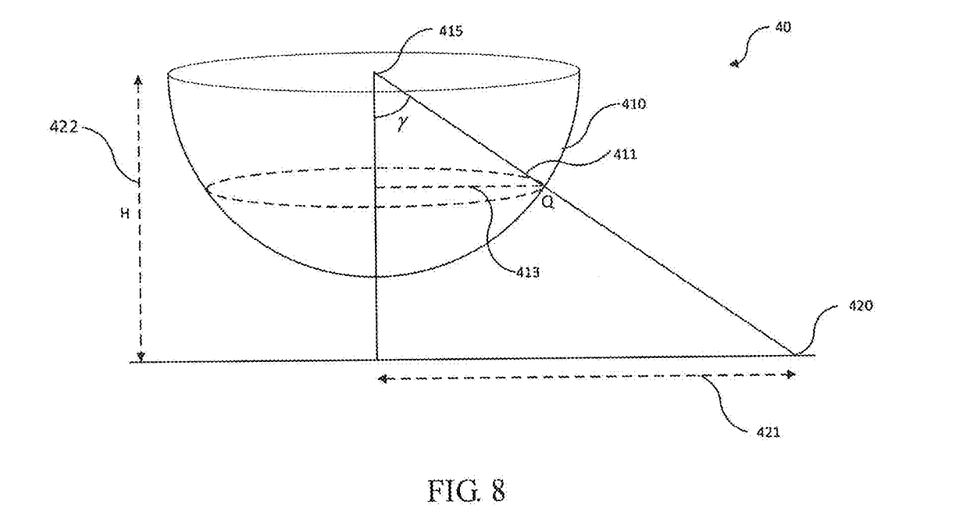
FIG. 8 is a second schematic diagram of positioning algorithm with curved light surface.

Referring to FIGS. 7 and 8, the following formulas can be obtained:

$$(Rsense/2)/Rcut = \cos(\beta/2)$$

$$2Rcut = Rshade$$

Therefore, $$Rsense/Rshade = \cos \beta/2$$

Referring to FIG. 7, the following formulas can be obtained:

$$\pi - \beta + \pi/6 = \alpha = ShadowLen/PeriodLen \cdot 2\pi$$

$$\beta = (7/6 - 2ShadowLen/PeriodLen)\pi$$

FIG. 7 further illustrates that:

$$Rsense = Rshade \cdot \sin \gamma$$

Therefore, $$r = H \cdot \tan(\arcsin(Rsense/Rshade)) = H \cdot \tan(\arcsin(\cos(\beta/2))) = H \cdot \tan(\text{arcarcsin} (\cos(7/12 - ShadowLen/PeriodLen)\pi))$$

Wherein, $$\gamma = \arcsin(\cos(7/12 - ShadowLen/PeriodLen)\pi)$$

The vertical angle γ can be obtained by substituting the frame length PeriodLen and the shadow width ShadowLen of the variable-angle opaque region measured by the receiver into above formulas.

The horizontal angle θ and the vertical angle γ are calculated to determine a set of two-dimensional coordinates of the receiver.

If a relative height of the vertical height difference 422 between the transmitter and the receiver is unknown, two transmitters 10 with different flashing frequencies can be used with a frequency division multiplexing method. The receiver 30 receives and utilizes optical signals with different flashing frequencies transmitted from the two transmitters 10 to determine a vertical height of the receiver 30 and calculate a three-dimensional position of the receiver 30.

When using the apparatus and the method of positioning with curved light surface described above, the transmitter 10 transmits optical signals 10 to the receiver 30. The receiver 30 receives the optical signals and obtains the position of the receiver 30 by processing the optical signals. The wireless module 302 transmits the position of the receiver 30 to a server.

Thus, the apparatus and method of positioning with curved light surface provided in present disclosure can accurately position the receiver 30, and the receiver can be placed on an object surface to receive optical signals of the transmitter 10, so that a precise indoor positioning can be carried out. In an intelligent production environment, a robot can accurately assist to assemble and convey materials and products. The positioning accuracy of the present disclosure can reach centimeters to millimeters level.

Although the respective embodiments have been described one by one, it shall be appreciated that the respective embodiments will not be isolated. Those skilled in the art can apparently appreciate upon reading the disclosure of this application that the respective technical features involved in the respective embodiments can be combined arbitrarily between the respective embodiments as long as they have no collision with each other. Of course, the respective technical features mentioned in the same embodiment can also be combined arbitrarily as long as they have no collision with each other.

The above-mentioned embodiments merely present several embodiments of the present disclosure, which are described specifically and in detail but should not be interpreted as limit to the scope of the present disclosure. It should be noted that those skilled in the art may make various modifications and improvements without departing from the concept of the present disclosure, all of which fail in the protection scope of the present disclosure. Therefore, the protection scope of the present disclosure shall be subject to the appended claims.

What is claimed is:

1. An apparatus of positioning with curved light surface, comprising a transmitter and a receiver, wherein the transmitter is capable of transmitting optical signals to the receiver, the receiver is capable of receiving the optical signals transmitted by the transmitter, the apparatus of positioning with curved light surface determines a position of the receiver according to the optical signals received by the receiver, wherein the transmitter comprises a light emitter, which is capable of emitting signals of at least two flashing frequencies; and a hemispherical cover, the cover is provided with a fixed-angle opaque region and a variable-angle opaque region, a region between the fixed-angle opaque region and the variable-angle opaque region defines a light passing region, each radius angle of each arc generated by an intersection of each line of latitude of the cover and the fixed-angle opaque is the same, and each radius angle of each are generated by an intersection of each line of latitude of the cover and the variable-angle opaque region monotonically increases or decreases as the latitude increases.

2. The apparatus according to claim 1, wherein the fixed-angle opaque region comprises a first fixed-angle opaque region and a second fixed-angle opaque region, and perpendicular projections of these two regions on a bottom circle of the cover are sectors.

3. The apparatus according to claim 1, wherein a perpendicular projection of the variable-angle opaque region on a bottom circle of the cover is surrounded by three arcs, one are is centered on a center of the bottom circle of the cover, the other two arcs intersect at the center of the bottom circle and respectively intersect with two ends of the first arc.

4. The apparatus according to claim 3, wherein radius angles of the other two arcs are the same, and the other two arcs protrude toward the first arc.

5. The apparatus according to claim 1, wherein the transmitter is at least provided with a controller, a driving device, a stationary base, and a rotary base; the controller is coupled to the driving device and is configured to control an operation of the driving device; the driving device is connected to the rotary base and is configured to drive the rotary base to rotate at a preset angular velocity; and the rotated base is fixed connected to the cover and is capable of driving the cover to rotate synchronously when rotating.

6. The apparatus according to claim 5, wherein the transmitter is further provided with a rotation detector configured to detect a rotation period of the rotary base, and the controller controls the light emitter to emit optical signals with alternating flashing frequencies in successive rotation periods based on the detection result of the rotation detector.

7. The apparatus according to claim 6, wherein the rotation detector comprises an light coupler and a light blocking plate, the light coupler is provided with a notch; and the light blocking plate is positioned on the rotary base and a position thereof corresponds to the light coupler, when the rotary base rotates, the light blocking plate is capable of passing through the notch of the light coupler.

8. The apparatus according to claim 1, wherein the receiver is at least provided with a receiving single chip microcomputer (SCM), an optical sensor, and a wireless module; the optical sensor receives the optical signals transmitted by the transmitter; the receiving single chip microcomputer is coupled to the optical sensor and is configured to process information of the optical signals received by the optical sensor; and the wireless module is coupled to the receiving single chip microcomputer and is configured to receive a processed result of the receiving chip microcomputer and transmit the processed result to a server.

9. A method of positioning with curved light surface, employing the apparatus of position with curved light surface according to claim 1, wherein the transmitter transmits optical signals with a preset flashing frequency via the light emitter, the optical signals pass through the opaque region of the cover to generate a shadow;

the transmitter activates a driving device to rotate the cover at a preset angular velocity;

the receiver receives the optical signals at a preset sampling frequency and obtains a shadow width and a frame length of the variable-angle opaque region by means of analog-to-digital conversion of an optical sensor; and a receiving single chip microcomputer in the receiver calculates a position of the receiver according to preset information.

10. The method according to claim 9, wherein the preset information at least comprises a radius of the cover, diameters of circles that contain the symmetric arcs of the variable-angle opaque region, a rotational speed of the rotary base, a radius angle of the arc generated by the intersection of the fixed-angle opaque region and an arbitrary latitude line of the cover, height of the transmitter, and a vertical height difference between the transmitter and the receiver.

* * * * *